Oct. 25, 1932.   V. L. OESTNAES ET AL   1,884,155
METHOD OF INSERTING AND SECURING OBJECTS IN THE OPEN ENDS OF HOLDERS
Filed Sept. 5, 1929
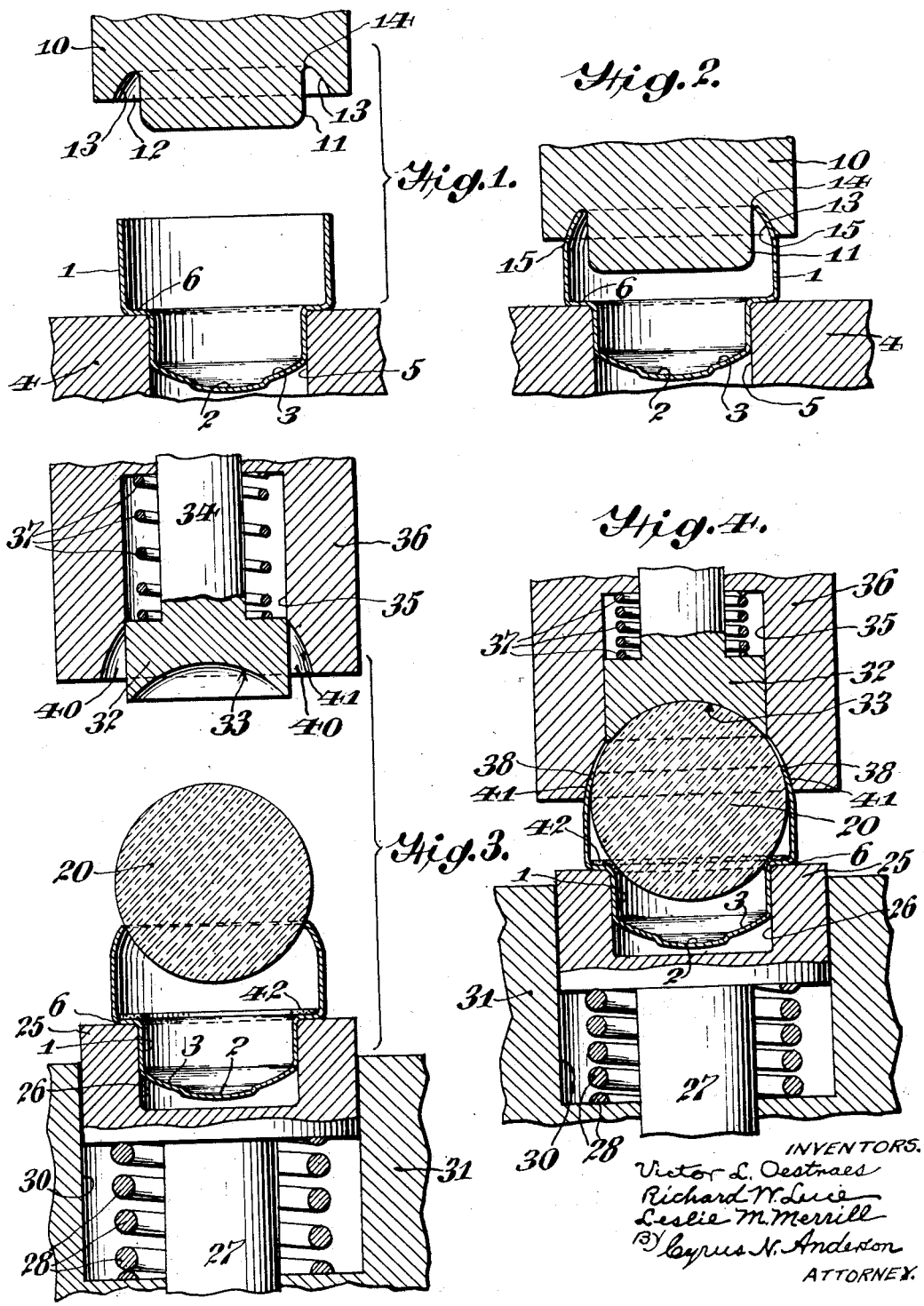

Patented Oct. 25, 1932

1,884,155

UNITED STATES PATENT OFFICE

VICTOR L. OESTNAES, OF WESTFIELD, RICHARD W. LUCE, OF MOUNTAINSIDE, AND LESLIE M. MERRILL, OF MADISON, NEW JERSEY, ASSIGNORS TO AMERICAN GASACCUMULATOR COMPANY, OF ELIZABETH, NEW JERSEY, A CORPORATION OF NEW JERSEY

METHOD OF INSERTING AND SECURING OBJECTS IN THE OPEN ENDS OF HOLDERS

Application filed September 5, 1929. Serial No. 390,442.

Our invention relates to the art or method of inserting and securing an object in the open end of a holder therefor.

Although we have illustrated the method of our invention as employed in the manufacture of a light signal reflector device comprising a spherical lens member supported in the outer open end of a sheet metal receptacle, the bottom of which is light reflecting, yet we have entitled and referred to our invention in broad terms because it is capable of employment in the assembling of open ended holders and objects to be held thereby of various kinds and descriptions and is not limited in its application to the use illustrated in the drawing. For convenience of description, however, we shall describe specifically the use or employment of the method of our invention in the manufacture of reflector devices of the character shown in the drawing but the disclosure of such specific device is made for the purpose of enabling a clearer description of the invention and is not to be taken as in any respect a limitation thereof.

The general object of our invention is to provide a novel method whereby an object of appropriate shape may be inserted into the open end of a holder therefor and the open end portion of the said holder caused to fit snugly and closely against the said object to retain it within the said open end.

A more specific object of the invention is to provide a method of novel character for assembling the receptacle and the lens member in the manufacture of a reflector device of the character hereinbefore indicated.

It also is an object of the invention to provide a novel method by the employment of which the inner side of the outer end portion of the receptacle of a reflector device may be caused to fit closely and snugly against the outer side of a lens member.

Without attempting to refer to further objects and purposes of the invention we shall now proceed to describe the same in detail and in doing so shall make specific reference to other objects and purposes of the invention or else such other objects and purposes will be apparent from the description.

In order that the invention may be more easily described and the method in accordance with the same rendered more apparent, reference should be had to the accompanying drawing wherein we have illustrated means by which the art or method of the invention may be carried out; but reference to the mechanism illustrated in the drawing is for purposes of description and is not to be taken as in any way a limitation of our invention.

In the drawing:

Fig. 1 is a view in longitudinal section of a receptacle in its original form (produced by die pressing operations), adapted to receive a spherical lens member, and also showing portions of dies by which the outer edge portion of the receptacle is bent inwardly and caused to converse;

Fig. 2 is a similar view, but showing the die members after operation to effect inward bending and converging of the outer edge of the receptacle;

Fig. 3 is a view showing the spherical lens member in position to be inserted into the receptacle and also showing the means for effecting such insertion; and Fig. 4 is a view similar to that of Fig. 3 but showing the spherical lens member within the receptacle and indicating the manner of its insertion thereinto.

In the drawing we have shown a receptacle 1, which may be produced in the manner described in the application of Richard W. Luce and Leslie M. Merrill, filed September 5, 1929, Serial No. 390,480, the bottom of which comprises a central reflecting spherical surface 2 and an annular spherical reflecting surface 3. The said receptacle 1 is mounted upon a die member 4, having an opening 5 therein into which projects the lower portion of the said receptacle, which lower portion is of less diameter than the upper portion as is clearly shown in the drawing. The shoulder portion 6 intermediate the lower portion of reduced diameter and the upper or outer portion of larger diameter rests upon the edge portion of the die 4 surrounding the opening 5. The die member 10, which operates as a plunger, is provided with a central projecting portion 11, which is of smaller diameter than the upper or outer portion of the receptacle 1 and is adapted to project into the latter as indicated in Fig. 2. The lower surface of the plunger die member 10 is provided with an annular groove 12, the inner circular side of which is parallel with the axis of said member 10. The outer surface 13 of the groove 12 is curved as indicated and is tapered inwardly to the bottom of the groove to meet a portion 14, which flares outwardly from the bottom edge of the circular side of the groove 12. The exterior diameter of the outer open side of the groove 12 is greater than the external diameter of the upper or outer portion of the receptacle 1. This fact will be apparent from an inspection of Fig. 1 of the drawing. When the plunger die member 10 descends the projecting portion 11 enters the open top of the receptacle 1. The said open top enters the groove 12 and the outer side of the upper edge portion thereof contacts with the curved side 13 of the groove so that as the plunger continues its descending movement the upper or outer edge portion of the said receptacle is bent inwardly as indicated at 15 so that the edge portion thereof tapers or converges inwardly. The edge portion of the open end of the receptacle is bent inwardly beyond the elastic limit of the metal of the receptacle so that it will not return to its original position after the removal therefrom of the forming or bending instrumentality. It is bent inwardly a sufficient distance to reduce the opening into the receptacle to a point such that its diameter is substantially less than the diameter of the member, for example, a spherical lens 20, which is to be inserted therethrough into the receptacle and to such extent that as the said edge portion springs or returns part way back to its original position after the insertion of said member therethrough the diameter of said opening is still less than the diameter of the object to be inserted so that it will grip or press against the adjoining portion of the side of the object so inserted.

The receptacle having been formed by pressure into the shape shown in Fig. 2 is then placed upon a yieldingly supported holder 25, the said holder being provided at its top with an opening or recess 26 into which the lower closed end portion of the receptacle of reduced diameter extends. The holder 25 is in the form of a head upon the upper end of a guiding support 27 and is supported by means of a coiled spring 28 located between the bottom of the said head and the bottom of an opening 30 within a block 31 within which opening the holder 25 is located and operates. The lens member 20 (which is spherical but may be of other shape) having been placed in position with respect to the opening into the receptacle as shown in Fig. 3 the plunger device shown in position above the same is caused to descend into engagement with the said member 20 to force it into the said receptacle. The plunger device comprises inner and outer members as shown. The inner member comprises a head portion 32, the face of the lower or working end of which is provided with a centrally located spherical recess 33, which is adapted to engage the outer or top surface of the lens member 20. The head 32 is connected with or mounted upon the lower end of a supporting member 34 and operates within an axial opening 35 provided in a member 36 of the plunger structure. A coiled spring 37 located within the opening 35 and bearing at one end against the bottom of said opening and at its opposite end against the upper inner side of the said head 32 tends to hold the latter in an outer position and also operates as the plunger descends to exert a yielding pressure upon the lens member 20 to force the same between the edges of the outer end of the receptacle 1 into the latter. Upon reference to Fig. 3 it will be noted that the portion of the member 20 with which the inner edge of the opening into the receptacle contacts is inclined or flared outwardly so that upon the application of pressure by the plunger to the said member 20 it acts to spread the said edges apart to permit its passage into the said receptacle. The excess of the diameter of the member 20 over that of the diameter of the opening into the receptacle is not sufficiently great as to cause an outward bending of the outer end portions of the said receptacle beyond the elastic limit of the metal of said receptacle. In consequence the said end portions spring back or return toward their normal position and thereby operate to press firmly against the adjoining surface portion of the said member 20 as is shown in Fig. 4.

To make more certain that the said end portion of the receptacle may be caused to conform closely to the adjoining surfaces of the member 20 we have widened the lower end portion of the opening 35 as indicated at 40. The inner surface of the widened outer end portion of the opening is curved as indicated at 41 and tapers or converges toward the axis of the plunger structure and as it contacts with the outer side of the upper or outer end portion of the receptacle 1 it presses the same with relatively great force against the opposing surface portion of the member 20.

By the provision of the springs 28 and 37 it will be observed that the lens member 20 is inserted by a yielding pressure whereby fracture or breaking thereof is reduced to a minimum if not prevented entirely.

It will be seen that by our invention we have provided a method by which a member such, for example, as a lens of the character shown may be inserted quickly into a receptacle and the conformation of the outer edge portion of the open end of the receptacle with the adjoining surface portion of the said member effected practically simultaneously with such insertion.

It will be noted that the member 20 rests upon the inner edge of the shoulder 6 and contacts with an annular washer 42 of suitable material, such as rubber or the like. The washer 42 constitutes not only a cushioning means but also means for effecting a hermetic seal. The action of the inwardly bent outer end portions of the receptacle against the member 20 operates to hold it firmly in contact with the member 42.

Having thus described our invention, what we claim and desire to secure by Letters Patent is:

1. The method of inserting a member into the open end of a holder therefor and securing the same therein which comprises the bending inwardly of the outer edge portion of the said open end to reduce the same so that its diameter is less than the diamter of the portion of the member which extends into the said open end, placing the said member in the said opening, yieldingly supporting said holder, applying pressure to said member to cause expansion of the outer edge portion of the open end of said holder to permit the passage of the said member through the open end of said holder, and applying pressure to the outer side of the outer edge portion of the open end of said holder to set the said portion firmly and snugly against the adjoining surface portion of the said member.

2. The art of producing a reflector device which consists in the forming of a receptacle from sheet metal which receptacle is circular in cross section and which has open and closed ends, the inner surface of the latter being spherical and light reflecting, applying positive pressure to the outer side of the outer end portion of the open end of said receptacle to force the outer end portions thereof inwardly into convergent relation, yieldingly supporting the said receptacle, placing a spherical transparent member upon the open end of said receptacle with a portion thereof projecting into said open end, applying yielding pressure to cause relative movement of the said receptacle and said transparent member toward each other thereby momentarily spreading apart the convergent open edge portion of the open end of the said receptacle and applying pressure to the outer side of the outer edge portion of the open end of the said receptacle to set the said portion firmly and snugly against the adjoining surface portion of the said transparent member.

3. The art of producing a reflector device embodying a receptacle having an open end and a closed end, the inner surface of the closed end being light reflecting and being spherical, and a spherical transparent member located in the open end portion of said receptacle, which consists in forming the said receptacle with a tubular cylindrical outer portion, applying pressure to the outer side of the outer end portion of the open end of said receptacle to cause inward bending and convergence of the said end portion, yieldingly supporting the said receptacle, placing a spherical transparent member in the open end of said receptacle, the said spherical member being of greater diameter than the said open end, applying a yielding pressure to the said spherical member and thereby spreading the convergent edge portion of the open end of said receptacle to permit the passage of the said spherical member into the said receptacle, the spring action of the metal of the said edge portion causing the same to move inwardly to clamp against the adjoining surface of the said transparent member after the insertion of the latter into said receptacle and applying pressure to the outer side of the outer edge portion of the open end of the said receptacle to press the said outer edge portion against the adjoining portion of the said spherical member.

4. The art of producing a reflector device which comprises the forming of a receptacle from sheet metal which receptacle is circular in cross section and which has open and closed ends, the inner surface of the latter being spherical and light reflecting, applying positive pressure to the outer side of the outer end portion of the open end of said receptacle to force the outer end portion thereof inwardly into convergent relation, supporting said receptacle, placing a spherical transparent member upon the open end of said receptacle with a portion thereof projecting into said open end, applying pressure to cause relative movement of the said receptacle and said transparent member toward each other thereby momentarily spreading apart the convergent open edge portion of the open end of the said receptacle, and applying pressure to the outer side of the outer edge portion of the open end of said receptacle to set the said portion firmly and snugly against the adjoining surface portion of the said transparent member.

5. The art of producing a reflector device which consists in the forming of a receptacle from sheet metal which receptacle is circular in cross section and which has open and closed ends, the inner surface of the latter being spherical and light reflecting, applying pressure to the outer side of the outer end portion of the open end of said receptacle to force said outer end portion inwardly into convergent relation, placing a spherical transparent member upon the open end of said receptacle with a portion thereof projecting into said open end, applying yielding pressure to cause relative movement of the said receptacle and said transparent member toward each other thereby momentarily spreading apart the convergent open end portion of the open end of the said receptacle, and applying pressure to the outer side of the outer edge portion of the open end of said receptacle to set the said portion firmly and snugly against the adjoining surface portion of the said transparent member.

In testimony that we claim the foregoing as our invention, we have hereunto signed our names this 30th day of August, A. D. 1929.

VICTOR L. OESTNAES.
RICHARD W. LUCE.
LESLIE M. MERRILL.